United States Patent [19]
Nakanishi

[11] Patent Number: 4,958,943
[45] Date of Patent: Sep. 25, 1990

[54] BALL BEARING

[75] Inventor: Tsutomu Nakanishi, Kunitachi, Japan

[73] Assignee: C.S.U. Ltd, Tokyo, Japan

[21] Appl. No.: 293,934

[22] Filed: Jan. 5, 1989

Related U.S. Application Data

[63] Continuation of Ser. No. 920,692, Oct. 17, 1986, abandoned.

[30] Foreign Application Priority Data

Oct. 25, 1985 [JP] Japan .................. 60-165494
Dec. 16, 1985 [JP] Japan .................. 60-194142
Mar. 14, 1986 [JP] Japan .................. 61-37145
Jun. 25, 1986 [JP] Japan .................. 61-98070

[51] Int. Cl.$^5$ .................................. F16C 33/60
[52] U.S. Cl. ............................ 384/488; 384/478;
384/505; 384/514
[58] Field of Search ............... 384/488, 478, 514, 505,
384/615, 499, 500, 501, 504

[56] References Cited

U.S. PATENT DOCUMENTS

| | | | |
|---|---|---|---|
| 751,715 | 2/1904 | Butler | 384/505 |
| 1,374,988 | 4/1921 | Cooper | 384/505 |
| 2,011,192 | 8/1935 | Comstock | 384/488 |
| 3,722,968 | 3/1973 | Bomberger | 384/505 |
| 4,238,018 | 12/1980 | Maucher | 384/615 |
| 4,581,799 | 4/1986 | Bessinger | 384/488 |

Primary Examiner—Lenard A. Footland
Attorney, Agent, or Firm—Ladas & Parry

[57] ABSTRACT

This invention is to provide a ball bearing which has a performance close to that of the conventional radial ball bearing, is simple in the formation and is low in the cost for such bearing as for fitting the disc of a disc recording and reproducing device or the roller of the drawer of a desk or the like.

13 Claims, 8 Drawing Sheets

BALL BEARING

This is a continuation on application Ser. No. 920,692 filed Oct. 17, 1986, now abandoned.

FIELD OF THE INVENTION

This invention relates to ball bearings and, more particularly, to ball bearings providing for relative rotation between shafts and other members.

BACKGROUND OF THE INVENTION

A radial ball bearing 40 as of the prior art is shown in FIG. 21 and is generally used as a ball bearing for bearing various miniature devices. This radial ball bearing 40 comprises an inner race 41, balls 42 and an outer race 43 and employs a so-called double sealing structure wherein sealing members 44 are arranged respectively on both sides of the balls 42 provided between the outer race 43 and inner race 41 in order to prevent dust and the like from entering the ball part and reducing the performance during the use.

In assembling the above structures, first of all, the inner race 41 and outer race 43 are put into a jig, then the outer race 43 or inner race 41 is slid into a position such as to make a clearance into which the balls 42 can be inserted, a proper number of balls 42 are put into the clearance and are moved to a predetermined position, the outer race 43 and inner race 41 are made coaxial with each other, a retainer is put in, is positioned in the hole and is pressed in and then the sealing members 44 are appropriately fitted to assemble the radial ball bearing 40.

In fitting the bearing to a fitting member 45, a fitting screw 46 which is a separate member is inserted into the inner race 41 and is screwed into a threaded part 45a of the fitting member 45 and side of the fitting member 45 is thus fixed so that side of the outer race 43 may be rotatable or, as shown in FIG. 22, a fixing member 47 is fitted and fixed to the outer race 43 so that the side may be fitting member 45 side is rotatable.

However, there are defeciencies in that the radial ball bearing 40 of the above mentioned construction is difficult to assemble, is therefore high in the cost, requires the fitting screw 46 in order to be fitted to the fitting member 45, and is therefore difficult to fit.

SUMMARY OF THE INVENTION

This invention seeks to overcome the above mentioned deficiencies and has as an object to provide a ball bearing which is simplified in construction, is easy to assemble, is low in cost and has a performance close to that of the conventional radial ball bearing.

Another object of the present invention is to provide a ball bearing wherein the inner race is integrated with the shaft to make the bearing small.

A further object of the present invention is to provide a ball bearing wherein the number of balls can be increased as required in the assembling step and a desired rigidity can be easily retained.

Another object of the present invention is to provide a ball bearing wherein there is required no complexity such as that, in the conventional radial ball bearing, in order to make the clearance between the inner race and outer race proper for the diameter of the balls, the dimensions of the outside diameter of the inner race and the inside diameter of the outer race must be measured to obtain a relationship for keeping a proper clearance. As will be seen, the diameter of the balls can be made somewhat larger as required and the rigidity can be increased.

DESCRIPTION OF THE PREFERRED EMBODIMENTS

Figure 1:
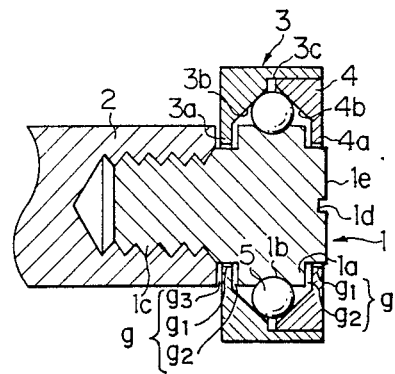
FIG. 1 is a schematic vertically sectioned view of a first embodiment of the present invention.

In the first embodiment shown in FIG. 1, an annular large diameter part 1a is formed on the outer periphery of a substantially columnar shaft 1 and a groove 1b substantially semicircular in cross-section over the entire periphery is formed substantially in the middle of the outer peripheral surface of this large diameter part 1a. A male screw 1c is formed integrally with this shaft to project in axial direction so as to be screwable into the threaded part of a fitting member 2. Reference numeral 1d represents a screw driver groove formed in diametrical direction substantially in the middle of the outer end surface 1e of the shaft 1 on the side reverse to the side on which the male screw is provided.

A substantially cylindrical outer race 3 is provided to enclose the outer periphery of the large diameter part 1a is separated from and opposed to the outer periphery. An opening of a large diameter is formed on the end surface 1e side of the shaft 1. A hole of a diameter smaller than of the opening is formed in the bottom on the opposite side to insert the shaft 1. A later described dust preventing part 3a is formed on the peripheral edge of this hole. Further, a tapered surface 3b functioning as a ball receiving part is formed in the inside corner of the outer race 3, is inclined toward the dust preventing part 3a substantially from the middle of the inner peripheral wall 3c of the outer race 3 so as to be set as tapered substantially at 30 to 45 degrees with the inner peripheral wall 3c and has the above mentioned flange-shaped dust preventing part 3a formed at the outer end.

Further, a bearing race 4 is contained and fixed within the opening of the outer race 3. A hole to be fitted to the outer periphery of the shaft 1 is formed substantially in the center of this bearing race 4. The same flange-shaped dust preventing part 4a as the dust preventing part 3a of the outer race 3 is formed on the peripheral edge of this hole. The bearing race 4 has a tapered surface 4b formed on the inner peripheral wall and is fixed on the outer peripheral wall of the outer race 3 by pressing, screwing or bonding so as to be integral with the outer race 3.

A plurality of balls 5 are provided between the outer race 3 and shaft 1 and are partly received by the two tapered surfaces 3a and 4b shaped like V in the cross-section on the outer race 3 side. The dust preventing parts 3a and 4b are positioned respectively in the stepped parts formed on both sides of the large diameter part 1a on the shaft 1. The dust preventing parts 3a and 4a are in no contact with the shaft 1 so as to form a slight horizontal gap $g_1$ and vertical gap $g_2$ which form a dust preventing gap g for preventing dust and the like from entering the ball part through these slight gaps.

An assembling example is explained in the following.

First of all, the shaft 1 on which the groove 1b is formed and the outer race 3 are put into a jig of a proper formation (not illustrated) and the outer race 3 is arranged on the outer periphery of the shaft 1. Then, the ball contacting surfaces are painted with a grease or oil. Then, a predetermined number of spherical balls 5 are put into the opening of the outer race 3 on the outer periphery of the shaft 1. The bearing race 4 is put into the accommodating opening, while the balls 5 are held by the groove 1b and tapered surface 3b, and is fixed to the inner peripheral wall 3c of the outer race.

For fitting the shaft 1 to the fitting member 2, the male screw 1c is integrally formed on the part opposite the end surface 1e of the shaft 1. The shaft 1 can thus be easily screwed to the fitting member 2 without using any particular fitting screw.

In such case, if the fitting member 2 is of a diameter larger than that of the shaft 1, a vertical gap $g_3$ will be able to be formed between the outer wall surface of the dust preventing part 3a and the fitting member 2 opposed to it and can improve the dust preventing function in the inside part together with the horizontal gap $g_1$ between the outer peripheral surface of the dust preventing part 3a and the outer peripheral surface of the shaft 1 and the vertical gap $g_2$ between the inner wall surface of the dust preventing part 3a and the side surface of the large diameter part 1a.

By the way, in using the ball bearing, it is needless to say that the shaft 1 side may be fixed so that the outer race may be rotatable or, on the contrary, the outer race 3 side may be fixed so that the shaft 1 side may be rotatable.

In case the outer race 3 side is made rotatable so that the bearing may be used for a roller, it will be preferable to integrally provide the outer race 3 by integrally molding a resin or the like on the outer periphery of the outer race 3. In the later described respective embodiments, in case the ball bearing is to be used to bear a roller, a resin may be integrally provided as required on the outer periphery of the rotatable outermost peripheral member.

In the first as well as the following embodiments, the array of balls and the race define an axis of symmetry (see axis A in FIG. 1) generally common to the shaft. The array of balls (and usually the race) defines a plane of symmetry P perpendicular to axis a. From FIG. 1 and the following figures, it will be seen that the inner or outer race members are formed of two or more parts which trap the balls in the opposed race member and which bear on the balls from opposite sides of the plane of symmetry P.

Figure 2:
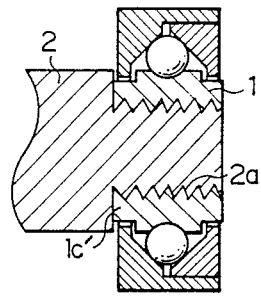
FIG. 2 shows a second embodiment of the present invention.

The second embodiment of the present invention shown in FIG. 2 is different from the first embodiment in respect that, in the second embodiment, the shaft 1 is made integral with a female screw. That is to say, a through hole is formed in the shaft 1, a female screw 1c' is formed on the inner peripheral surface of this through hole and, on the other hand, a male screw 2a is formed on the fitting member 2 side so that the male screw 2a and female screw 1c' may be screwed with each other.

The other formation is the same as in the above described embodiment and therefore shall not be explained. As in FIG. 1, however, FIG. 2 shows the race parts separated by distance T adjacent the balls which permits both parts to be brought into bearing relationship with the balls. This also applies to the following embodiments.

Figure 3:
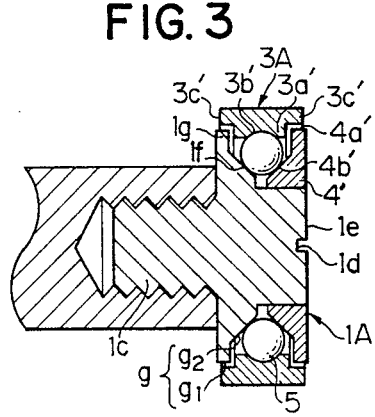
FIG. 3 shows a third embodiment of the present invention.

The third embodiment of the present invention shown in FIG. 3 is characterized in that a groove 3b' substantially semicircular in the cross-section is formed in the outer race 3A provided as separated and opposed around the outer periphery of a shaft 1A and the balls 5 are rotatably held by two tapered surfaces 1f and 4b' provided on the male screw type shaft 1A side.

That is to say, the screw driver groove 1d is formed on the end surface 1e of the outer end part of the male screw type shaft 1A and a tapered surface 4b' of the bearing race 4' is fixed as directed inward on the outer periphery of the outer end part. By the way, a flange-shaped dust preventing part 4a' is formed at the outer end of this tapered surface 4b'. The tapered surface 1f opposed to the tapered surface 4b' of the bearing race 4' to be substantially V-shaped in the cross-section is formed on the outer periphery of the shaft 1A and has a flange-shaped dust preventing part 1g formed at the outer end.

The shaft 1A and outer race 3A are put into a jig and are painted with a grease or oil on the surfaces to be in contact with a proper number of balls put in between them and then the balls 5 are put in and are received by a ball receiving groove 3b' in a small diameter part 3a' formed in the inner peripheral part of the outer race 3A and a bearing race 4' may be inserted into the opening from outside the shaft 1A and may be fixed in a proper position. In such case, the dust preventing parts 1g and 4a' will be positioned respectively in the flange-shaped dust preventing parts 3c' formed on both sides of the small diameter part 3a' so as to be in no contact with the outer race 3A. The dust preventing gap g consisting of the horizontal gap $g_1$ and vertical gap $g_2$ is formed between them.

Figure 4:
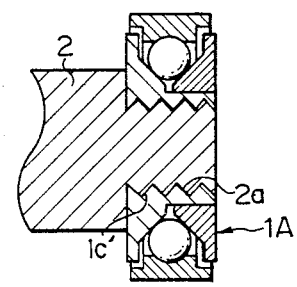
FIG. 4 shows a fourth embodiment of the present invention.

The fourth embodiment of the present invention shown in FIG. 4 is different from the third embodiment in respect that, in the fourth embodiment, the shaft 1A is of a female screw integral type, a female screw 1c' is formed in the inner peripheral part of the hole formed in the shaft 1A and the fitting member 2 side has a male screw 2a.

The other formation is the same as in the third embodiment.

By the way, in the above mentioned respective embodiments, the ball receiving part provided in the shaft or outer race is formed of a groove substantially semicircular in the cross-section but can be formed of a V-groove V-shaped in the cross-section.

In the above mentioned third and fourth embodiments, the flange-shaped dust preventing parts 3c' formed respectively on both sides of the outer race 3A, and the dust preventing part 1g of the shaft 1A and the dust preventing part 4a' of the bearing race 4' can be omitted in order to improve the workability of these respective parts.

Figure 5A:
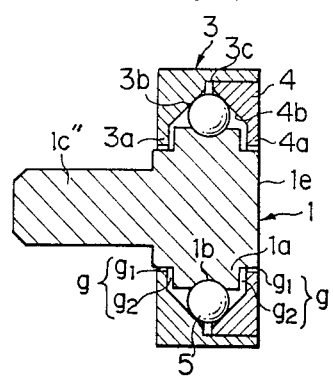
FIG. 5 shows a fifth embodiment of the present invention.

The fifth embodiment of the present invention shown in FIG. 5(a) is different in respect that, in the fifth embodiment, the male screw 1c part provided integrally with the shaft 1 in the first embodiment shown in FIG. 1 is made merely a substantially columnar fitting part 1c'' not threaded on the outer periphery.

Figure 5B:
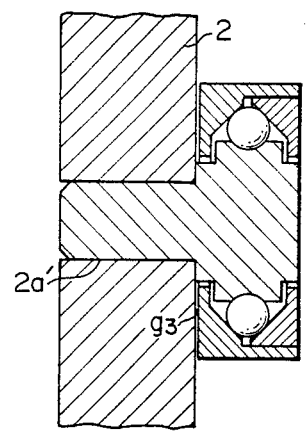

Therefore, in fitting, as shown in FIG. 5(b), the fitting part of the shaft can be easily fitted into the fitting hole 2a' of the fitting member 2 by pressing in.

The other formation is the same as in the first embodiment and therefore the same members shall be represented respectively by the same reference numerals and shall not be detailed.

Figure 6A:
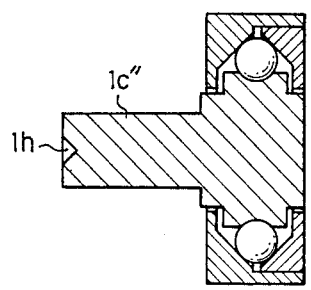
FIG. 6 shows a sixth embodiment of the present invention.
Figure 6B:
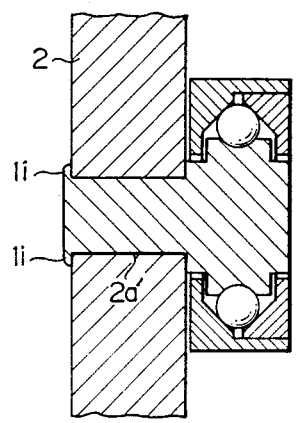

The sixth embodiment of the present invention shown in FIGS. 6(a) and 6(b) is different from the fifth embodiment in respect that, in the sixth embodiment, a fitting part 1c'' is inserted into a a fitting hole 2a' in the fitting member 2 and the tip part exposed on the other side is fitted by calking. In FIG. 6(b), the reference numeral 1d represents a calked part. In FIG. 6(a), the reference numeral 1h represents a countersink formed in the tip part of the fitting part 1c but, needless to say, this countersink 1h may be absent.

Figure 7:
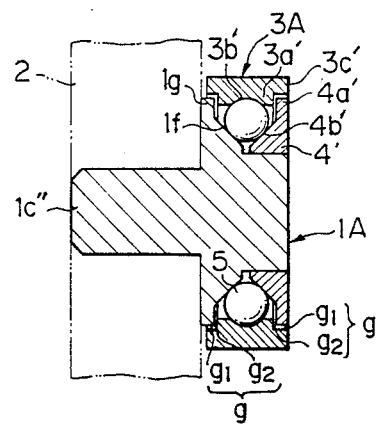
FIG. 7 shows a seventh embodiment of the present invention.

The seventh embodiment of the present invention shown in FIG. 7 is different from the third embodiment in respect that, in the seventh embodiment, the male screw 1c part provided integrally with the shaft 1 in the third embodiment shown in FIG. 3 is made a substantially columnar fitting part 1c'' not threaded on the outer periphery. The shaft is fitted to the fitting member 2 through this fitting part 1c''.

The other formation is the same as in the third embodiment and therefore the same members shall be represented respectively by the same reference numerals and shall not be detailed.

Figure 8:
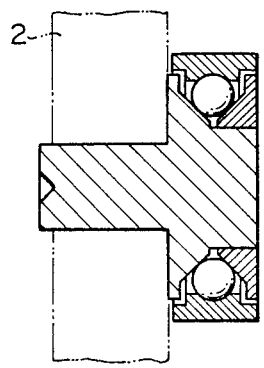
FIG. 8 shows a eighth embodiment of the present invention.

The eighth embodiment of the present invention shown in FIG. 8 is different from the seventh embodiment in respect that, in the eighth embodiment, the fitting part 1c is fitted to the fitting member 2 by calking but is otherwise the same.

Figure 9A:
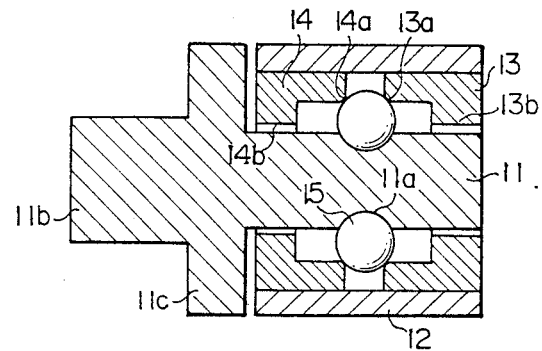
FIG. 9 shows a ninth embodiment of the present invention.
Figure 9B:
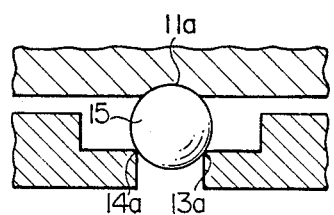

In the ninth embodiment of the present invention shown in FIGS. 9(a) and 9(b), a groove 11a substantially semicircular in the cross-section is formed around the outer periphery of a shaft 11. A cylindrical roller sleeve 12 is provided as separated and opposed around the outer periphery on which the groove 11a for receiving balls is formed. A pair of outer races 13 and 14 are fixed on the outer peripheral surfaces to the inner peripheral surface of this roller sleeve 12. The respective outer races 13 and 14 have rounded points 13a and 14a formed inside the inner peripheral surfaces and are projected axially outside toward the outer peripheral surface of the shaft to be in the form of steps of a smaller diameter to form dust preventing parts 13b and 14b for controlling dust and the like entering the interior from outside to be minimum. A fine dust preventing gap is formed between the inner peripheral surfaces of the steps and the outer peripheral surfaces of the shaft. By the way, the respective rounded points 13a and 14a are positioned inside and are arranged as opposed to each other.

A plurality of balls 15 are provided between the ball receiving groove 11a and the pair of rounded points 13a and 14a so that the shaft 11 and roller sleeve 12 may be relatively rotatable. That is to say, the balls 15 are borne by the ball receiving part 1a and rounded points 13a and 14a to form ball rolling surfaces.

A fitting part 11b is integrally formed at one end of the shaft 11, a flange 11c functioning also as a dust preventing wall is integrally formed between the roller sleeve 12 side and the fitting part 11b and a fine gap is formed between the inner wall surface of the flange 11c and the roller sleeve 12 and outer race 14 side so that, in this case, as the gap has a dust preventing function, the dust preventing part 14b on the outer race 14 side may be absent.

By the way, in the above, the outer races 13 and 14 are generally barrel-ground. In such case, the corner parts will be somewhat rounded. In this embodiment, such parts are made the rounded points 13a and 14a for bearing the balls 15, no other particular working is required and the manufacture is that much easy.

In assembling, first of all, the outer race 14 to be positioned inside is fitted to the inner peripheral surface of the roller sleeve and is arranged on the outer periphery of the shaft 11 through a proper jig. Then a proper number of balls 15 are put in and, as required, a grease or the like is injected. Then, when the outer race 13 positioned outside and functioning as a ball receiver and presser is fixed to the inner peripheral surface of the roller sleeve 12, a ball bearing will be able to be easily assembled.

Figure 10:
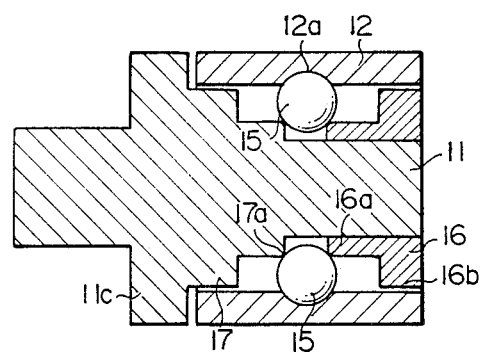
FIG. 10 shows a tenth embodiment of the present invention.

In the tenth embodiment of the present invention shown in FIG. 10, a groove 12 semicircular in the cross-section is formed substantially in the middle of the inner peripheral surface of a roller sleeve 12 but, on the other hand, rounded points are provided on the shaft side so that the balls 15 may be borne by them. That is to say, inner races 16 and 17 having the same dust preventing parts 16b and 17b and rounded points 16a and 17a as in the ninth embodiment are provided outside the shaft 11. By the way, the inner race 17 on the flange 11c side of the shaft 11 opposed to the outside inner race 16 is formed integrally with the shaft 11. This inner race 17 may be a separate body fixed onto the shaft 11. However, there are advantages that, if the inner race 17 is thus formed integrally with the shaft 11, in assembling, the trouble of incorporating and fixing the inner race 17 onto the shaft 11 will be able to be omitted and the workability will improve. By the way, the balls 15 are borne by the ball receiving groove 12a and the rounded points 16a and 17a.

Figure 11A:
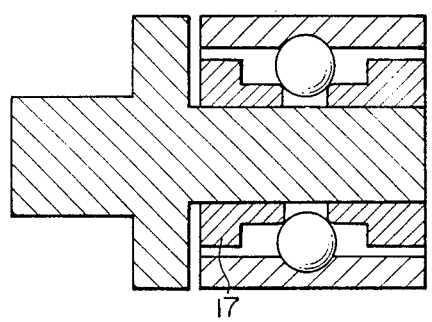
FIG. 11 shows a eleventh embodiment of the present invention.

In the eleventh embodiment of the present invention in FIG. 11(a), the inner race 17 in the tenth embodiment is made a separate body.

Figure 11B:
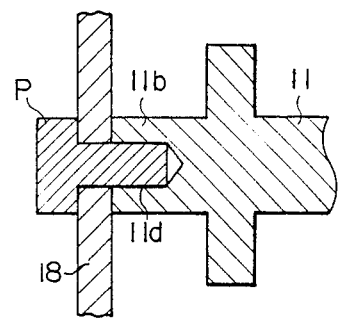

FIG. 11(b) shows an example wherein a slot 11d is formed in a shaft fitting part 11b and is contacted at the end with a fitting plate 18 and a pin P is pressed in from the other side to fit and fix the shaft 1.

Figure 12:
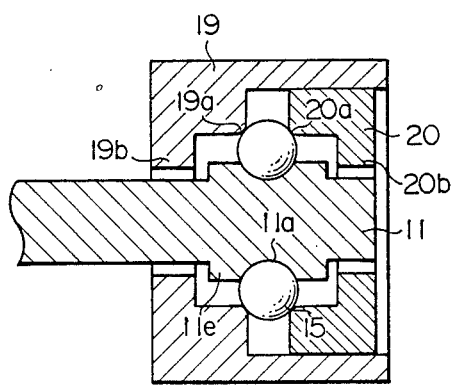
FIG. 12 shows a twelfth embodiment of the present invention.

In the twelfth embodiment of the present invention shown in FIG. 12, no flange is formed integrally with the shaft but a large diameter part 11e is formed, a groove 11a for receiving the balls is formed on the outer periphery of this large diameter part 11e and a pair of large and small outer races 19 and 20 are provided so as to enclose the outer periphery. In such case, one outer race 19 is large and is also the roller sleeve 12 in the ninth embodiment. That is to say, a dust preventing part 19b is provided to project on the side facing the shaft 11 in one end part of one outer race 19 and a rounded point 19a is provided to project in the bottom. The small outer race 20 is fixed as a bearing race within the opening on the other end side. The shape of this outer race 20 is substantially the same as in the ninth embodiment and is fixed to the inner peripheral wall of the opening of the outer race 19. The balls 15 are borne by the ball receiving groove 11a and two rounded points 19a and 20a. The entry of dust and the like into the ball part is controlled by the dust preventing parts 19b and 20b on both sides to be minimum.

Figure 13:
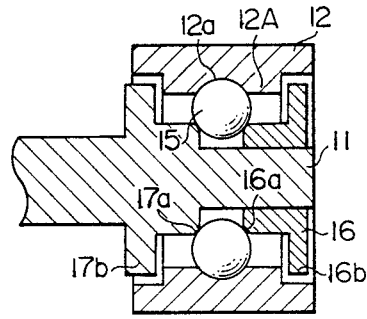
FIG. 13 shows a thirteenth embodiment of the present invention.

The thirteenth embodiment of the present invention shown in FIG. 13 is a modification of the tenth embodiment. A small diameter part 12A is formed on the inner periphery of the outer race 12 to step the inner periphery. The dust preventing part 17b of the shaft 11 and the dust preventing part 16b of the inner race 16 are opposed to the stepped parts on both sides through dust preventing gaps. The balls 15 are borne by the rounded point 17a on the shaft 11 side, the rounded point 16a of the inner race 16 fixed to the shaft 11 and the ball receiving groove 12a of the outer race 12.

Figure 14:
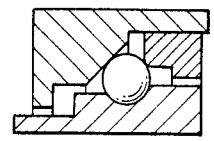
FIG. 14 shows a fourteenth embodiment of the present invention.

In the fourteenth embodiment of the present invention shown in FIG. 14, one rounded point in the twelfth embodiment shown in FIG. 12 is made a tapered surface. It is shown that either rounded point can be replaced with a tapered surface. Needless to say, it can be applied to any other embodiment.

Figure 15:
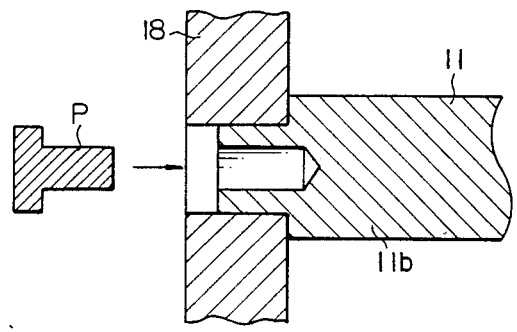
FIG. 15 shows an example of fitting a shaft.

FIG. 15 shows another fitting example than that shown in FIG. 11(b) in the ninth to fourteenth embodiments and shows that the outer peripheral end of the shaft fitting part 11b is formed to be small in the diameter and is inserted into a hole in the fitting plate 18 and a pin P is pressed in from the other side to fix the shaft 11 in the fitting part.

By the way, the fitting example is not limited to the above. For example, it is needless to say that the shaft may be fitted by merely pressing the shaft fitting part 11b into the fitting plate 8 without using the pin P or by any other proper method.

Figure 16:
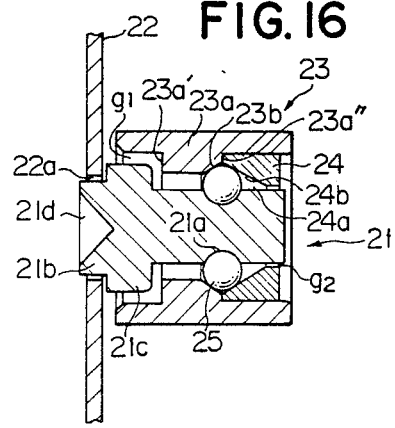
FIG. 16 shows a fifteenth embodiment of the present invention.

In the fifteenth embodiment of the present invention shown in FIG. 16, it is preferable to use the ball bearing, for example, as a bearing for fixing a floppy disc of 3.5 inches.

The shaft 21 in this embodiment is similar to that in the ninth embodiment shown in FIG. 9. That is to say, a fitting part 21b fitted to a fitting member 22 is formed in one end part of the substantially columnar shaft 21 and a dust preventing flange part 21c of a large diameter is formed near this fitting part. A groove 21a substantially semicircular in cross-section for receiving the balls is formed as by cutting on the outer periphery in a proper position of the shaft 21. An outer race 23 is coaxially provided to enclose the outer periphery of the other end part or the flange part of the shaft 21 as separated from and opposed to the outer periphery. A small diameter part 23a projecting inward is formed in a proper position of a part of the inner peripheral surface. One end part of the inner peripheral surface and one end surface of the small diameter part 23a are opposed to the flange part 21c through a slight dust preventing gap $g_1$. A tapered surface 23b is formed at the corner of the other end surface of the small diameter part 23a.

Further, a substantially short cylindrical bearing race 24 is inserted into an opening formed within the inner peripheral surface on the other end side of the outer race 23. A hole to be fitted to the outer periphery of the shaft 21 is formed in the axial center of this bearing race 24. A tapered surface 24b is formed on the small diameter part 23a side of the outer race to expand in the inside diameter gradually inward. The other end surface of the inner peripheral surface of the hole of the bearing race 24 is opposed to the outer periphery of the shaft 21 through a slight dust preventing gap $g_2$.

Thus, a plurality of balls 25 are borne by the groove 21a formed on the outer periphery of the shaft 21, the tapered surface 23b of the outer race 23 substantially V-shaped in the cross-section as a whole and the tapered surface 24b of the inner race 24 fixed to this outer race 23 side.

An assembling example shall be explained in the following.

First of all, the shaft 21 on which the ball receiving groove 21a is formed and the outer race 23 are put into a jig of a proper formation not illustrated, the outer race 23 is arranged on the outer periphery of the other end part of the shaft to the flange part 21c and the ball contacting surfaces are painted with a grease or oil. Then, a predetermined number of spherical balls 25 are put into the space between the outer periphery of the shaft 21 and the inner peripheral surface of the outer race 23 and, while the balls 25 are held by the groove 21a and tapered surface 23b, the bearing race 24 is put in from the opening side and is pressed to contact on the tapered surface 24b with the balls 5. When the bearing race 24 is thus fixed to the inner peripheral surface of the outer race 23 by a pressing, bonding or screwing means, the ball bearing of this embodiment will be able to be easily assembled.

In fitting the fitting member 22, the fitting part 21b of the shaft 21 may be fitted in the fitting hole 22a of the fitting member 22 by pressing or calking without using any particular fitting screw. By the way, in the drawing, the reference numeral 21d represents a calking countersink formed, as required, in the fitting part 21b.

By such formation, the outer race 23 side can be made rotatable with respect to the shaft 21. Further, in using, the entry of dust and the like into the ball part can be controlled by the respective dust preventing gaps $g_1$ and $g_2$ to be minimum.

The outer peripheral surface of the flange 21c is covered with the inner peripheral surface of the outer race 23 through the gap $g_1$, there is no such particular gap as in the past between the flange 21c and the ball part side and therefore, even if a compact ball bearing is incorporated in the device, there will be no fear that a metal piece or the like on the disc side will catch.

Figure 17:
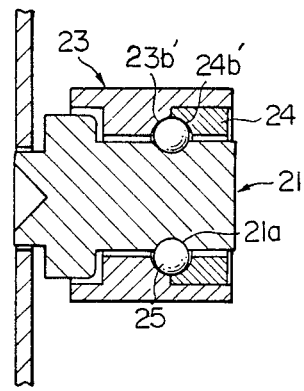
FIG. 17 shows a sixteenth embodiment of the present invention.

In the sixteenth embodiment of the present invention shown in FIG. 17, the V-shaped groove formed of the tapered surfaces 23b and 24b formed on the outer race 23 and bearing race 24 in the fifteenth embodiment shown in FIG. 16 is replaced with a groove semicircular in the cross-section formed of concave surfaces 23b' and 24b' and the balls 25 are borne by this groove and a groove 21a semicircular in the cross-section formed on the outer periphery of the shaft 21. The other formation and the assembling method are fundamentally the same as in the sixteenth embodiment.

Figure 18:
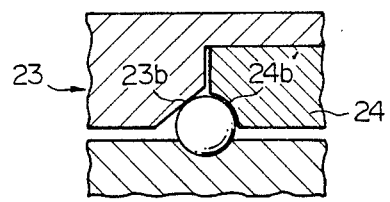
FIG. 18 shows a seventeenth embodiment of the present invention.

In the seventeenth embodiment shown in FIG. 18, the ball contacting part of the outer race 23 in the fifteenth embodiment shown in FIG. 16 is made the tapered surface 23b as it is and the ball contacting part on the bearing race 24 side is made a concave surface 24b'.

Figure 19:
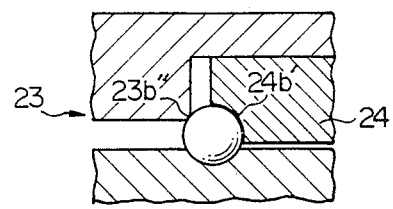
FIG. 19 shows a eighteenth embodiment of the present invention.

In the eighteenth embodiment of the present invention shown in FIG. 19, the ball contacting part of the outer race 23 in the fifteenth embodiment shown in FIG. 16 is made a rounded point 23b" and the ball contacting part of the bearing race 24 is made a concave surface 24b".

Figure 20:
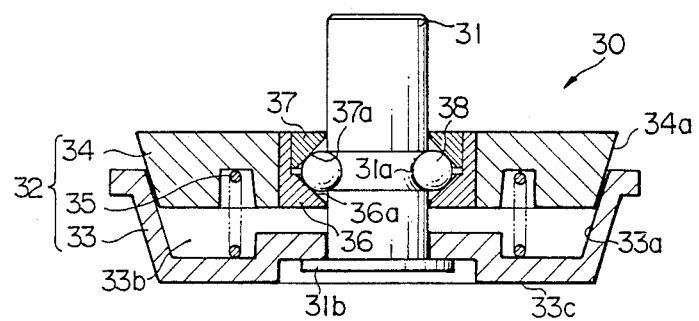
FIG. 20 shows an example of the applying of a ball bearing of the present invention.
Figure 21:
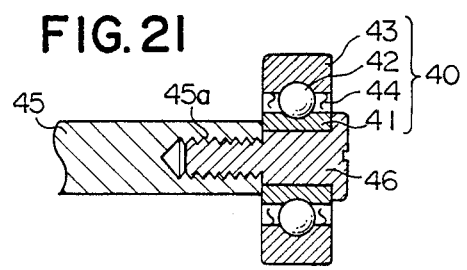
FIGS. 21 and 22 show a prior art ball bearing for comparison.
Figure 22:
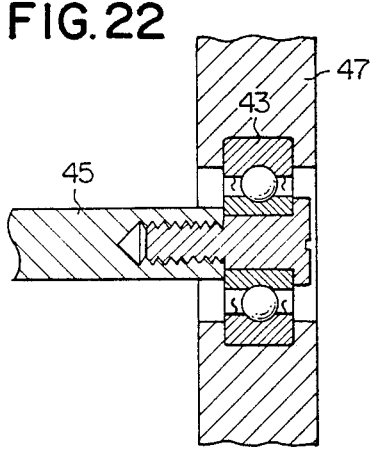

FIG. 20 shows an example wherein the rotating part of the ball bearing of the present invention is applied to a disc fixing pulley. This pulley 30 is provided with a substantially columnar shaft 31 in which a flange 31b is formed at one end and a groove 31a semicircular in the cross-section is formed in a proper position on the outer periphery and a rotor 32 rotating around this shaft 31. The rotor 32 is substantially bottomed short cylindrical and is provided with a disc fixing pulley 33 movable in the axial direction of the shaft 31, a pulley 34 located inside this disc fixing pulley 33 and a coil spring 35 provided between this pulley 34 and the disc fixing pulley 33.

The pulley 34 is made of a synthetic resin and is made integral with the outer race 36 on the outer periphery as by integral molding. A plurality of balls 38 are provided between an outer race 36 having a tapered surface 36a, a bearing race 37 provided on the inner peripheral surface of this outer race 36 and having a tapered surface 37a forming a V-shaped groove together with the tapered surface 36a and the groove 31a. The disc fixing pulley 33 is made rotatable around the shaft 31. By the way, the outer peripheral surface of the pulley 34 is made a tapered surface 34a of such form that the diameter of the pulley 34 reduces toward the flange 31b side of the shaft 31. The pulley 34 is positioned within the hollow 33b of the disc fixing pulley 33. The inner peripheral wall of the disc fixing pulley 33 is formed to be a tapered surface 33a corresponding to the tapered surface 34a.

The assembling of the disc fixing pulley shall be explained in the following.

A hole for inserting the shaft 31 is formed in the center of the disc fixing pulley 33. The shaft 31 is inserted into the disc fixing pulley 33 through this hole. The disc fixing pulley 33 is held by the flange 31b of the shaft 31. The disc fixing pulley 33 is movable in the axial direction of the shaft 31.

The coil spring 35 is put in a predetermined position on the upper surface of the disc pulley 33. Then, the outer race 36 having the pulley 34 on the outer periphery is fitted around the shaft 31. A grease or oil is put into such bearing parts as the tapered surface 36a of the outer race 36 and the part of the groove 31a. Then, a proper number of balls 38 are put in. Then, the bearing race 37 may be fixed in a proper position to the outer race as by bonding.

By the way, in case the assembly is used as a disc fixing pulley, the shaft 31 will be fitted at the upper end to another movable member not illustrated and the disc fixing pulley will be contacted on the flat lower surface with the disc. This disc fixing pulley 33 is movable with respect to the shaft 31, the coil spring 35 is provided between the disc fixing pulley 33 and pulley 34, the tapered surface 33a of the inner peripheral wall of the disc fixing pulley 33 is formed to correspond to the tapered surface 34a of the pulley 34 and therefore the disc can be stably pressed.

According to the present invention formed as in the above, the ball bearing is easier to assemble than the conventional radial ball bearing, is adapted to be mass-produced and therefore can be reduced in the cost.

The inner race of the conventional radial ball bearing is made integral with the shaft in the present invention and can be made that much smaller.

Further, the number of balls can be increased as required in the assembling step and any desired rigidity can be easily obtained.

In the conventional radial ball bearing, in order to make the clearance between the inner race and outer race proper for the diameter of the ball, the dimensions of the outside diameter of the inner race and the inside diameter of the outer race must be measured to make an assembly keeping a proper clearance. However, such trouble can be made unnecessary, the diameter of the ball can be made somewhat larger as required and the rigidity can be increased.

What is claimed is:

1. A ball bearing for a floppy disc comprising:
   a shaft having an outer periphery with a groove of part circular cross-section,
   a plurality of balls partly received in said groove,
   a ring-shaped outer race, and
   a bearing race,
   said outer race and said bearing race being separate from said shaft and surrounding the outer periphery of said shaft in spaced relation, said outer race and bearing race respectively having inner peripheral surfaces forming ball rolling surfaces in contact with said balls to bear against the balls engaged within said groove,
   said shaft including a cylindrical portion of larger diameter surrounded by said outer race to form a gap between said portion of larger diameter and said outer race to protect the balls from entry of dust;
   said bearing race having an outer peripheral surface inserted into and secured to the inner peripheral surface of said outer race for rotatably supporting said balls against the ball rolling surface of the outer race and against the groove in the shaft; and
   said outer race having first and second end portions of larger diameter and a central portion of smaller diameter so that a central step is formed in the outer race, said central step having one corner formed with a tapered surface to constitute said ball rolling surface of the outer race.

2. A ball bearing as claimed in claim 1 wherein said shaft has an end surface which is recessed in the outer race.

3. A ball bearing as claimed in claim 1 wherein said bearing race has an end surface which is recessed in the outer race.

4. A ball bearing as claimed in claim 1 wherein said outer periphery of said bearing race is bonded to said inner periphery of said outer race.

5. A ball bearing as claimed in claim 1 wherein said bearing race is fitted in said first end portion of the outer race and faces said step.

6. A ball bearing as claimed in claim 5 wherein said larger diameter portion of the shaft is received in said second end portion of the outer race.

7. A ball bearing as claimed in claim 1 wherein said bearing race is press-fit in said outer race.

8. A ball bearing as claimed in claim 1 wherein said outer race has a cylindrical outer peripheral surface which is free and adapted to serve as a bearing surface for a floppy disc.

9. A ball bearing as claimed in claim 1 wherein said inner peripheral surfaces of the outer race and the bearing race form a V-shaped groove.

10. A ball bearing as claimed in claim 9 wherein said outer race has an outer surface, said bearing race being received within said outer race.

11. A ball bearing as claimed in claim 10 wherein said cylindrical portion of the shaft forms a second gap with said bearing race for preventing dust entry therebetween.

12. A ball bearing as claimed in claim 1 wherein said inner peripheral surfaces of said outer race and bearing race are conical and form a V-shaped groove bearing on said balls.

13. A ball bearing as claimed in claim 1 comprising a flange member fitted on said shaft proximate said cylindrical portion of larger diameter so that said gap faces said flange member.

* * * * *